(12) United States Patent
Criel (10) Patent No.: US 12,241,590 B2
(45) Date of Patent: Mar. 4, 2025

(54) END FITTING FOR A PRESSURIZED FLUID RESERVOIR

(71) Applicant: Plastic Omnium New Energies France, Lyons (FR)

(72) Inventor: Bjorn Criel, Brussels (BE)

(73) Assignee: Plastic Omnium New Energies France, Lyons (FR)

( * ) Notice: Subject to any disclaimer, the term of this patent is extended or adjusted under 35 U.S.C. 154(b) by 122 days.

(21) Appl. No.: 17/791,135

(22) PCT Filed: Jan. 14, 2021

(86) PCT No.: PCT/EP2021/050637
§ 371 (c)(1),
(2) Date: Jul. 6, 2022

(87) PCT Pub. No.: WO2021/144335
PCT Pub. Date: Jul. 22, 2021

(65) Prior Publication Data
US 2023/0046665 A1    Feb. 16, 2023

(30) Foreign Application Priority Data

Jan. 14, 2020   (FR) ....................................... 2000328
Mar. 6, 2020   (FR) ....................................... 2002257

(51) Int. Cl.
*F17C 1/06*        (2006.01)
(52) U.S. Cl.
CPC ........ *F17C 1/06* (2013.01); *F17C 2201/0119* (2013.01); *F17C 2201/056* (2013.01);
(Continued)
(58) Field of Classification Search
CPC ............... F17C 1/06; F17C 2201/0119; F17C 2201/056; F17C 2203/0604;
(Continued)

(56) References Cited

U.S. PATENT DOCUMENTS 3,366,522 A   1/1968  Underwood
4,515,516 A *  5/1985  Perrine ..................... F17C 5/06
                                                  222/61
(Continued)

FOREIGN PATENT DOCUMENTS

CN          103347685 A     10/2013
DE     10 2009 025 386 A1   12/2010
(Continued)

OTHER PUBLICATIONS

International Search Report mailed on Apr. 23, 2021 in PCT/EP2021/050637 filed on Jan. 14, 2021 (4 pages).

*Primary Examiner* — Kareen K Thomas
(74) *Attorney, Agent, or Firm* — Oblon, McClelland, Maier & Neustadt, L.L.P.

(57) ABSTRACT

End fitting for a pressurized fluid reservoir, the reservoir comprising a liner (2) which comprises a tubular central portion (20) with a first cylindrical outer surface (21), characterized in that the end fitting (1) comprises an end portion (10) with a second cylindrical outer surface (11), the end portion (10) being configured to be positioned coaxially with respect to the tubular central portion (20), the second cylindrical outer surface (11) forming a radially flush extension of the first cylindrical outer surface (21), the end fitting (1) being configured to be mounted in a sealed manner on the outside of a neck (22) of the liner (2) by means of an annular sealing joint (4) arranged coaxially with respect to the end portion (10) in an annular groove (12) provided in an inner recess (13) of the end fitting (1) such that the internal pressure in the reservoir has a tendency to push the neck (22) radially outwards against the annular sealing joint (4).

19 Claims, 2 Drawing Sheets

(52) U.S. Cl.
CPC ............... *F17C 2203/0604* (2013.01); *F17C 2203/0607* (2013.01); *F17C 2203/0619* (2013.01); *F17C 2203/066* (2013.01); *F17C 2203/067* (2013.01); *F17C 2205/0305* (2013.01); *F17C 2205/0326* (2013.01); *F17C 2205/0341* (2013.01); *F17C 2209/2154* (2013.01); *F17C 2209/224* (2013.01); *F17C 2209/234* (2013.01); *F17C 2221/012* (2013.01); *F17C 2221/033* (2013.01); *F17C 2221/035* (2013.01); *F17C 2223/0123* (2013.01); *F17C 2223/036* (2013.01); *F17C 2250/043* (2013.01); *F17C 2250/0439* (2013.01); *F17C 2250/0491* (2013.01); *F17C 2260/012* (2013.01); *F17C 2260/018* (2013.01); *F17C 2270/0168* (2013.01)

(58) Field of Classification Search
CPC ...... F17C 2203/0607; F17C 2203/0619; F17C 2203/066; F17C 2203/067; F17C 2205/0305; F17C 2205/0326; F17C 2205/0341; F17C 2209/2154; F17C 2209/224; F17C 2209/234; F17C 2221/012; F17C 2221/033; F17C 2221/035; F17C 2223/0123; F17C 2223/036; F17C 2250/043; F17C 2250/0439; F17C 2250/0491; F17C 2260/012; F17C 2260/018; F17C 2270/0168; Y02E 60/32
See application file for complete search history.

(56) References Cited

U.S. PATENT DOCUMENTS

| | | | |
|---|---|---|---|
| 4,785,956 A * | 11/1988 | Kepler | F17C 1/16 220/62.19 |
| 5,004,120 A | 4/1991 | Hembert | |
| 5,472,024 A * | 12/1995 | Brugerolle | F17C 13/084 141/351 |
| 6,230,922 B1 | 3/2001 | Rasche et al. | |
| 2004/0045970 A1 | 3/2004 | Debecker et al. | |
| 2004/0188445 A1 | 9/2004 | Debecker et al. | |
| 2012/0080106 A1 | 4/2012 | Griebel et al. | |
| 2012/0085727 A1 | 4/2012 | Fratti | |
| 2013/0299505 A1 | 11/2013 | Otsubo et al. | |
| 2014/0299215 A1* | 10/2014 | Moulik | F17C 1/16 137/899.4 |
| 2015/0211684 A1* | 7/2015 | Santos | F17C 11/007 137/1 |
| 2016/0201853 A1* | 7/2016 | Weickert | F17C 11/007 220/86.1 |
| 2016/0201854 A1* | 7/2016 | Weickert | F17C 11/005 73/73 |
| 2017/0159868 A1* | 6/2017 | Fisher | F16L 55/027 |
| 2018/0043125 A1* | 2/2018 | Bencke | A61M 16/0816 |
| 2018/0066796 A1* | 3/2018 | Heon | B21C 23/10 |
| 2018/0080589 A1* | 3/2018 | Heon | F16L 37/008 |
| 2018/0141798 A1* | 5/2018 | Spilotro | B67D 1/1422 |
| 2019/0277451 A1 | 9/2019 | Ogiwara et al. | |
| 2022/0034452 A1 | 2/2022 | Wahl et al. | |

FOREIGN PATENT DOCUMENTS

| | | |
|---|---|---|
| DE | 10 2017 204 707 A1 | 9/2018 |
| EP | 0 398 827 A1 | 11/1990 |
| EP | 2 949 449 A1 | 12/2015 |
| FR | 1.431.135 | 1/1966 |
| FR | 2 257 855 A1 | 8/1975 |
| FR | 3 089 160 A1 | 6/2020 |
| JP | 2019-143722 A | 8/2019 |
| WO | WO 01/57429 A1 | 8/2001 |
| WO | WO 2010/142303 A1 | 12/2010 |
| WO | WO 2016/067207 A1 | 5/2016 |

* cited by examiner

END FITTING FOR A PRESSURIZED FLUID RESERVOIR

CROSS REFERENCE TO RELATED APPLICATIONS

The present application is a 371 national stage application of PCT/EP2021/050637, filed Jan. 14, 2021, and claims priority to French patent application FR2000328, filed Jan. 14, 2020 and to French patent application FR2002257, filed Mar. 6, 2020.

The present invention relates to reservoirs intended to contain pressurized fluids, in particular reservoirs on board motor vehicles. The invention relates more specifically to end fittings for such reservoirs. The fluids in question are for example, and non-limitingly, natural gas, biogas, liquefied petroleum gas, hydrogen.

The different functions of these reservoirs are to:
contain the pressurized fluid, i.e. hold up mechanically,
ensure sealing with respect to the outside,
ensure the filling with pressurized fluid, using a solenoid valve mounted on the end fitting,
deliver the pressurized fluid using the same solenoid valve mounted on the end fitting,
attach to the supporting structure,
withstand the transport and use conditions,
withstand external attacks from the environment, both mechanical and thermal,
withstand reservoir manufacturing conditions.

These reservoirs can be mounted on all fixed or mobile equipment (road, rail, sea, air, space vehicles). Pressurized fluid reservoirs are made of metallic materials or, more recently, of composite materials, for weight saving and safety reasons.

With regard to reservoirs made of composite materials, also called composite reservoirs, they are generally sealed by fitting a receptacle called a "liner" that is capable of sealing the container with respect to the contents. Depending on the reservoir builders, liners are offered in metallic materials or in plastic materials.

The "plastic"-type liner comprises at least one opening for filling and emptying the reservoir. It is manufactured by injection or by rotational molding or by extrusion-blow molding of a thermoplastic or thermosetting polymer material (abbreviated "thermodur") such as, for example, polyethylene, polyamide, polyphthalamide, polyurethane or silicone. Advantageously, the thermoplastic polymer material is filled with reinforcing fibers to form a composite material. The reinforcing fibers are, for example, glass fibers, carbon fibers, basalt fibers, aramid fibers, polymer fibers, silica fibers, polyethylene fibers, natural fibers, metal fibers, metal alloy fibers or ceramic fibers. These fibers make it possible to increase the resistance to deformation of the composite material. In a polymer material loaded with reinforcing fibers, the reinforcing fibers and the polymer material are entangled so as to form an integral material. Such a composite material is described by the Applicant in its French patent application No. 18 72197 filed on Nov. 30, 2018 and published under No. 3 089 160.

Alternatively, the liner is made by filament winding. An example of manufacturing a receptacle by filament winding is described in patent document FR1431135A.

This liner is then covered with a liner reinforcing enclosure made of composite material that will constitute the body of the reservoir, that is to say, the resistant structure of the reservoir, which must be able to withstand the pressures exerted by the fluid contained in the reservoir (hereinafter referred to as "internal pressure"). The reinforcing enclosure is generally not required to seal the reservoir.

This reinforcing enclosure consists of:
a reinforcement generally made up of continuous fibers, glass, carbon, basalt, or the like, such as silica fibers or even plant fibers,
a resin that is either deposited at the same time as the fiber (filament winding process) or after the enclosure has been produced to form a dry "preform." This dry preform is then consolidated in order to give it the necessary rigidity. This consolidation is carried out using an injection of resin or using an infiltration of this resin through said preform (infusion method), or even using an impregnation of resin under vacuum.

Advantageously, the reinforcing enclosure is coated with one or more layers of a fireproof material, preferably an intumescent fireproof material such as, for example, a coating based on silicate or phosphate. Silicate and phosphate are intumescent agents that, after exposure to fire, expand and create an insulating barrier. This improves the heat and fire resistance of the reservoir.

In all cases, at the time of manufacture of the reservoir, an end fitting is sealably assembled to the liner so as to allow the filling and delivery of the fluid. This end fitting is generally made of metal (steel or aluminum). It is attached to a liner filling/emptying neck and has a support collar against the liner. The end fitting also has a thread allowing a solenoid valve to be mounted on the end fitting. Such an end fitting is described in patent document U.S. Pat. No. 6,230,922.

To reduce the mass of a reservoir, it is known to reduce the filling/emptying opening of the liner in order to reduce the size of the associated end fitting and therefore its mass. This is particularly critical when the end fitting is made of steel; indeed, steel end fittings are stronger, but heavier. Aluminum end fittings are more fragile than steel end fittings, but they are more suitable for plastic liners due to their fairly similar expansion coefficients. In all cases, by reducing the filling/emptying opening of the liner, the quantity of material necessary to constitute the reinforcing enclosure of the liner is increased. Indeed, a liner conventionally comprises a hollow tubular central portion closed at its ends by two domes, at least one of which is provided with an opening for filling/emptying the liner. It is easy to understand that the smaller the filling/emptying opening of the liner, the more dome there is to cover with the reinforcing enclosure of the liner, which translates into an increase in the mass of the reservoir.

Other disadvantages of current end fittings also include:
the end fittings and their connections with the liner often have sealing defects, particularly over time, due to the actual design of the end fitting or the control of the expansion coefficients of the different materials,
the end fittings are not sufficiently attached to the liners to mechanically ensure the durability of the assemblies.

To increase the autonomy of a hydrogen-powered vehicle, for example, we naturally think of increasing the storage capacity on board the vehicle. An obvious solution is to replace the pre-existing hydrogen reservoir with a larger capacity reservoir. However, the space in which a pre-existing hydrogen reservoir is housed cannot be extended, so that it is not possible to increase the storage capacity by increasing the size of the reservoir. Another solution is to provide, from the design of the vehicle, a space suitable for storing a larger quantity of hydrogen. Such a space has a substantially prismatic and relatively flat shape. To maximize the use of this space, it is advantageous to fill it with a set of several long and thin reservoirs, that is to say, reservoirs having a high length-to-diameter ratio. In this case, seeking to reduce the mass of each reservoir while filling as much of the available storage space as possible is even more critical.

An object of the present invention is to overcome all or part of the aforementioned drawbacks by proposing technical solutions that meet users' expectations regarding the mass, the quantity of fluid stored and the longevity of the equipment.

To this end, the object of the invention is an end fitting for a pressurized fluid reservoir, the reservoir comprising a liner that comprises a tubular central portion with a first cylindrical outer surface, characterized in that the end fitting comprises an end portion with a second cylindrical outer surface, the end portion being configured to be positioned coaxially with respect to the tubular central portion, the second cylindrical outer surface forming a radially flush extension of the first cylindrical outer surface, the end fitting being configured to be mounted in a sealed manner on the outside of a neck of the liner by means of an annular sealing joint arranged coaxially with respect to the end portion in an annular groove provided in an inner recess of the end fitting such that the internal pressure in the reservoir has a tendency to push the neck radially outwards against the annular sealing joint. Owing to this arrangement, the sealing is particularly effective, especially at high pressure. Another advantage of this arrangement is that it makes it possible to reduce the creep of the plastic material of the liner at the point of contact of the first neck on the annular sealing joint.

"Radially flush" means without radial offset between the first cylindrical outer surface of the tubular central portion of the liner and the second cylindrical outer surface of the end portion of the end fitting.

Note that "radial" or "radially" refers to one (or more) direction(s) substantially perpendicular to the longitudinal axis of an object.

It should be noted that "interior" and "exterior" refer to the radial position of the parts of an object. For example, for an object with a longitudinal axis (X) provided with an outer surface and an inner surface, the outer surface of the object is radially farther from the longitudinal axis (X) than the inner surface of said object.

The end fitting according to the invention is thus perfectly suited to the sealing of an end fitting assembled on a liner of a long and thin reservoir. Indeed, in addition to better sealing of the end fitting, the Applicant has found that the higher the length-to-diameter ratio of a composite reservoir, the less material is needed to form the reinforcing enclosure of the liner. Indeed, for a reservoir having a length-to-diameter ratio greater than or equal to six (6), the presence of domes at the ends of the liner is no longer necessary. In doing so, the end fitting no longer needs a support collar against the liner, but a cylindrical end portion whose outer surface is intended to be aligned with the outer surface of the tubular central portion of the liner.

In addition, the absence of radial offset between the first cylindrical outer surface of the tubular central portion of the liner and the second cylindrical outer surface of the end portion of the end fitting allows better covering of the liner and the end fitting with the reinforcing enclosure of the liner.

Preferably, the end fitting is a piece of metal, for example aluminum.

According to an additional feature of the end fitting according to the invention, the second cylindrical outer surface of the end portion has a second outer diameter and the inner recess has a first inner diameter, such that the ratio of the first inner diameter to the second outer diameter is between 0.6 and 0.95, preferably between 0.8 and 0.95. This makes it possible to reduce the quantity of material necessary for the manufacture of the end fitting, thus reducing the mass of the end fitting and, consequently, the mass of the reservoir to which the end fitting is intended to be assembled.

Although presented as an additional feature of the end fitting according to the invention, the particular ratio of the first inner diameter to the second outer diameter is not limited to an end fitting according to the invention, but can be applied to any composite reservoir end fitting type. Thus, another object of the invention is an end fitting for a pressurized fluid reservoir, characterized in that the end fitting comprises an outer diameter and an inner diameter, such that the ratio of the inner diameter to the outer diameter is between 0.6 and 0.95, preferably between 0.8 and 0.95.

The invention also relates to a pressurized fluid reservoir, in particular for the storage and distribution of pressurized gas in a motor vehicle, comprising:
  a liner comprising:
    a tubular central portion provided with a first cylindrical outer surface having a first outer diameter,
    a first neck connected to the tubular central portion by a first shoulder,
  a first end fitting sealably assembled to the first neck,
  a liner reinforcing enclosure,
characterized in that the first end fitting comprises an end portion provided with a second cylindrical outer surface positioned coaxially with the tubular central portion in the radially flush extension of the first cylindrical outer surface, and in that the first end fitting is sealably assembled on the outside of the first neck of the liner by means of an annular sealing joint arranged coaxially with the end portion in an annular groove formed in an inner recess of the first end fitting so that the internal pressure of the reservoir has a tendency to push the neck radially outwards against the annular sealing joint.

Owing to this arrangement, the sealing of the reservoir is particularly effective, especially at high pressure. Another advantage of this arrangement is that it makes it possible to reduce the creep of the plastic material of the liner at the point of contact of the first neck on the annular sealing joint.

Thus, owing to the invention, it is possible to replace a single high-capacity storage reservoir with several lower-capacity reservoirs, in particular long and thin reservoirs, while maintaining a ratio between the mass of fluid stored and the mass of the acceptable storage assembly, for example, greater than 4% for a hydrogen storage assembly at 700 bar.

Preferably, the reservoir is of type IV, that is to say, a composite reservoir consisting of a plastic liner made, for example, by injection, rotational molding or extrusion-blow molding of a thermoplastic or thermoset polymer material, preferably, a thermoplastic polymer material filled with reinforcing fibers, on which liner a filament winding (composite winding) is done on the cylindrical portions as well as on the ends. For example, the liner is made of polyamide and its thickness is less than or equal to 5 mm.

Alternatively, the liner in the present invention is manufactured, for example, by injection, rotational molding or blow molding of a composite material. This makes it possible to reduce the thickness of the liner while maintaining the same resistance to deformation as a liner manufactured in the same way from a thermoplastic polymer material not filled with reinforcing fibers. Thus, with equivalent external dimensions and equivalent internal pressure resistance, a type IV reservoir comprising a liner made of a composite material makes it possible, on the one hand, to store more fluid than the same reservoir comprising a liner made of a thermoplastic polymer material not filled with reinforcing fibers and, on the other hand, to reduce the mass of the reservoir. Indeed, by reducing the thickness of the liner, it is also possible to reduce the thickness of the reinforcing enclosure of the liner by increasing the internal dimensions of the reservoir; in doing so, the useful volume of the reservoir is increased while reducing the quantity of material necessary to constitute the reinforcing enclosure.

Alternatively, the liner in the present invention is made by filament winding, for example, a web of continuous or short fibers impregnated with a polymer. The fibers are, for example, glass, carbon, basalt, aramid or other fibers such as silica or polyethylene fibers. This makes it possible to reduce the thickness of the liner while maintaining the same resistance to deformation as a liner manufactured in the same way from a thermoplastic polymer material. Thus, with equivalent external dimensions and equivalent internal pressure resistance, a type IV reservoir comprising a liner made by filament winding makes it possible, on the one hand, to store more fluid than the same reservoir comprising a liner made by injection, rotational molding or blow molding and, on the other hand, to reduce the mass of the reservoir. Indeed, by reducing the thickness of the liner, it is also possible to reduce the thickness of the reinforcing enclosure of the liner by increasing the internal dimensions of the reservoir; in doing so, the useful volume of the reservoir is increased while reducing the quantity of material necessary to constitute the reinforcing enclosure.

Alternatively, the liner in the present invention is made of metal, for example, 6061 aluminium.

According to additional features of the invention:
the second cylindrical outer surface of the end portion of the first end fitting has a second outer diameter, such that the second outer diameter is equal to the first outer diameter. Thus, it is ensured that there is no radial offset between the first cylindrical outer surface of the tubular central portion of the liner and the second cylindrical outer surface of the end portion of the first end fitting.
the inner recess of the end fitting has a first inner diameter and the neck of the liner has a third outer diameter, such that the first inner diameter is equal to the third outer diameter. Owing to this arrangement, the end fitting is assembled as close as possible to the neck of the liner.
a shrink-fit ring is arranged inside the first neck to hold the first neck radially tight against the annular sealing joint. Thus, the sealing is optimized to offer the same efficiency whatever the internal pressure of the reservoir.
the annular sealing joint is an elastomer seal. This allows the seal to deform under the effect of pressure and thus increase the effectiveness of the seal when the pressure increases.
the annular sealing joint is an O-ring. This makes it possible to adapt the seal to any shape of annular groove.
the first end fitting is sealably assembled to the first neck by an assembly of the screw-nut type. This facilitates the industrial assembly of the end fitting on the neck and allows the end fitting/neck assembly to better withstand the forces induced by filament winding.
the first end fitting is sealably assembled to the first neck by clipping. This allows the end fitting to be assembled more quickly.
the first end fitting is sealably assembled to the first neck by gluing or shrinking. This makes it possible to increase the mechanical strength of the end fitting/neck assembly.
opposite the first cylindrical outer surface of the tubular central portion of the liner, the second cylindrical outer surface of the end portion of the first end fitting is extended axially by a substantially hemispherical outer surface of a middle portion of the first end fitting, such that the substantially hemispherical outer surface is surrounded by the reinforcing enclosure of the liner. This allows the reinforcing enclosure of the liner to cling to the first end fitting.
the middle portion of the first end fitting comprises a fourth outer diameter, such that the ratio of the fourth outer diameter to the second outer diameter is between 0.5 and 0.95, preferably between 0.8 and 0.95. This makes it possible to optimize both the quantity of material necessary to constitute the composite winding and to attach the composite winding to the first end fitting. Indeed, once the ratio of the fourth outer diameter to the second outer diameter is less than 0.5, more composite winding is needed to cover the ends of the liner. Conversely, once the ratio of the fourth outer diameter to the second outer diameter is greater than 0.95, the attachment of the composite winding to the first end fitting is no longer really assured.
the reinforcing enclosure of the liner consists of a composite winding comprising several layers of reinforcing filaments wound in a helix around the tubular central portion of the liner and around the middle portion of the first end fitting, such that the helical winding angle of at least one first layer is less than 54°, preferably less than 53°, and such that the helical winding angle of at least one second layer is between 53° and 56°, for example 54.7°. This prevents the first end fitting from being ejected when the reservoir is pressurized owing to better attachment of the composite winding to the first end fitting. The aforementioned helical winding angles result from a selection made by the Applicant from among several possible angles. Indeed, it was during numerical simulations that the Applicant discovered that certain helical winding angles could provide better results than others in the bursting strength tests prescribed by Regulation No. 134 of the United Nations Economic Commission for Europe (UNECE).

It is recalled that the architecture of the composite windings and, in particular, the winding angles of the layers of reinforcing filaments are an important parameter as regards the mechanical strength of composite reservoirs. According to known works, an angle of 54.7° (calculations from "netting analysis" analytical models) appears to be an optimized angle for a composite reservoir containing only helical layers (layers of reinforcing filaments wound in a helix around the tubular central portion of the liner and around the middle portion of the first end fitting). Some studies speak more of an angle ±A, since the filament winding induces intersecting helical layers. However, the architecture of a type IV reservoir generally consists of helical layers, but also of circumferential layers (layers of reinforcing filaments wound circumferentially around the tubular central portion of the liner), the circumferential layers having the advantage of compacting the helical layers on the tubular central portion of the liner. The typical stacking sequence containing circumferential and helical layers is more of the (90°, A) type, where A is the helical winding angle, approximately 20° from the reservoir axis.

Nevertheless, the angle A can vary according to several parameters such as the number and the thickness of the layers or the order of the layers according to the recommended optimization objectives.

The Applicant made a surprising discovery by varying several of these parameters. Indeed, starting from a composite reservoir 90 mm in diameter, the Applicant stacked eight helical layers according to different helical winding angle configurations, three of which are presented in the table below (configurations A, B and C):

| Helical layer order number | Helical winding angle | | |
| --- | --- | --- | --- |
| | Config. A | Config. B | Config. C |
| 1 | 54.7° | 51.1° | 48.5° |
| 2 | 54.7° | 54.7° | 51.1° |
| 3 | 54.7° | 54.7° | 54.7° |
| 4 | 54.7° | 54.7° | 54.7° |
| 5 | 54.7° | 54.7° | 54.7° |
| 6 | 54.7° | 54.7° | 54.7° |
| 7 | 54.7° | 54.7° | 54.7° |
| 8 | 54.7° | 54.7° | 54.7° |

Then, the Applicant used the ComposicaD™ software, which uses analytical models of the "netting analysis" type, to calculate the burst pressure of the reservoir in the axial and radial directions of the reservoir for the different configurations studied; the table below shows the results obtained for configurations A, B and C:

| | Config. A | Config. B | Config. C |
| --- | --- | --- | --- |
| Calculation of reservoir burst pressure in axial direction (MPa) | 182.7 | 186.8 | 194.0 |
| Calculation of reservoir burst pressure in the radial direction (MPa) | 182.2 | 179.0 | 175.0 |

Finally, the Applicant calculated the ratio of the burst pressure of the reservoir in the axial direction to the burst pressure of the reservoir in the radial direction of the different configurations studied; the table below shows the result obtained for configurations A, B and C:

| | Config. A | Config. B | Config. C |
| --- | --- | --- | --- |
| Reservoir burst pressure in the axial direction/Reservoir burst pressure in the radial direction | 1 | 0.96 | 0.90 |

In the context of the burst resistance tests prescribed by UNECE Regulation No. 134, it is preferable that the rupture of the reservoir takes place in the tubular central portion of the reservoir rather than at its ends, in order to avoid end fitting ejection. Indeed, ejected end fittings are dangerous projectiles. To ensure that the rupture of the reservoir will take place in the tubular central portion of the latter, the ratio of the burst pressure of the reservoir in the axial direction to the burst pressure of the reservoir in the radial direction must be less than 1, ideally less than or equal to 0.9. Thus, configurations B and C respect this criterion and configuration C shows an ideal configuration.

at least a first layer of filaments is an inner layer of the composite winding and at least a second layer of filaments is an outer layer of the composite winding.

the reinforcing filaments consist of glass fibers, aramid fibers and/or carbon fibers.

the reinforcing enclosure of the liner is coated with one or more layers of a fire-retardant material, preferably an intumescent fire-retardant material such as, for example, a coating based on silicate or phosphate, preferably ammonium polyphosphate dosed from 10% to 50%. Indeed, the Applicant has carried out numerous tests of intumescent flame-retardant materials and discovered that a coating containing ammonium polyphosphate dosed from 10% to 50% gave the best results for an application to pressurized fluid reservoirs.

the reservoir comprises a fiberglass protective layer surrounding the reinforcing enclosure of the liner.

the ratio of the third outer diameter to the first outer diameter is between 0.6 and 0.95, preferably between 0.8 and 0.95. Owing to this arrangement, the neck is as wide as possible.

the first end fitting comprises at least one functional element chosen from among a pressure relief valve, preferably with thermal triggering, a valve forming a flow limiter, a non-return valve, a manual shut-off valve, an injector, a filter, a temperature sensor and a pressure sensor.

the second cylindrical outer surface and the substantially hemispherical outer surface of the end fitting are covered, at least partially, with a composite structure, the composite structure being sandwiched between the end fitting and the reinforcing enclosure of the liner. In this embodiment, the second outer diameter of the end fitting includes the composite structure.

The aforementioned composite structure has the function of reducing the elongation of the material of the end fitting, which makes it possible to reduce the mass of the end fitting and to increase the useful volume of the reservoir. In an example where the end fitting is made of aluminum, the elongation in the material of the end fitting subjected to the hydraulic cycling pressure as prescribed by UNECE Regulation No. 134 must typically be less than 0.5% in order to successfully pass the hydraulic cycling tests as prescribed by UNECE Regulation No. 134.

The aforementioned composite structure can be integrated into the reinforcing enclosure of the liner. Alternatively, the aforesaid composite structure can be independent of the reinforcing enclosure of the liner, that is to say, without chemical bonding therewith.

Owing to the composite structure according to the invention, it is possible to eliminate part of the reinforcing enclosure of the liner, which makes it possible to reduce the mass of the reservoir; in doing so, it is possible to accelerate the production rate of composite reservoirs by reducing the time necessary for filament winding.

The aforementioned composite structure comprises a thermoplastic or thermoset polymer material such as, for example, polyethylene, polyamide, polyphthalamide, polyurethane or silicone. Advantageously, the thermoplastic polymer material is filled with reinforcing fibers to form a composite material. The reinforcing fibers are, for example, glass fibers, carbon fibers, basalt fibers, aramid fibers, polymer fibers, silica fibers, polyethylene fibers, natural fibers, metal fibers, metal alloy fibers or ceramic fibers.

The aforementioned composite structure is manufactured by filament winding of the end fitting at the start of the manufacture of the reinforcing enclosure of the liner. Alternatively, the aforementioned composite structure is manufactured by overmolding a composite material onto the end fitting. In another alternative, the aforementioned composite structure is manufactured by positioning a layer of dry fibers on the end fitting, followed by a step of infusion molding or high-pressure resin transfer molding (HP-RTM). In another alternative, the aforementioned composite structure is manufactured from pre-impregnated ("towpreg") fibers.

Although presented as an additional feature of the reservoir according to the invention, the aforementioned helical winding angles are not limited to a reservoir according to the invention, but can be applied to any type of composite reservoir. Thus, another object of the invention is a pressurized fluid reservoir, in particular for storing and distributing pressurized gas in a motor vehicle, comprising a liner and a reinforcing enclosure for the liner, characterized in that the reinforcing enclosure of the liner consists of a composite winding comprising several helical layers, such that the helical winding angle of at least a first helical layer is less than 54°, preferably less than 53°, and such that the helical winding angle of at least a second helical layer is between 53° and 56°, for example 54.7°.

Similarly, although presented as an additional feature of the reservoir according to the invention, the particular ratio of the fourth outer diameter to the second outer diameter is not limited to a reservoir according to the invention, but can apply to any type of composite reservoir. Thus, another object of the invention is a pressurized fluid reservoir, in particular for storing and distributing pressurized gas in a motor vehicle, comprising an end fitting comprising an end portion provided with a cylindrical outer surface having a first outer diameter, the end portion being extended axially by a substantially hemispherical outer surface of a middle portion of the end fitting, characterized in that the middle portion of the end fitting comprises a second outer diameter, such that the ratio of the second outer diameter to the first outer diameter is between 0.6 and 0.95, preferably between 0.8 and 0.95.

Likewise, although presented as an additional feature of the reservoir according to the invention, the aforementioned composite structure is not limited to a reservoir according to the invention, but can be applied to any type of composite reservoir. Thus, another object of the invention is a pressurized fluid reservoir, in particular for storing and distributing pressurized gas in a motor vehicle, comprising a liner and an end fitting covered, at least partially, with a composite structure, the composite structure being sandwiched between the end fitting and a reinforcing enclosure of the liner.

The invention also relates to a vehicle, preferably a motor vehicle, comprising:
- a reservoir according to the invention,
- an energy conversion means configured to supply energy to propulsion means of the vehicle, which is in fluidic communication with the reservoir via the first end fitting so that it can be supplied with fluid,
- a reservoir filling means, which is in fluidic communication with the reservoir via the first end fitting, and
- an actuator configured to selectively actuate either the energy conversion means or the reservoir filling means, in response to a control signal.

BRIEF DESCRIPTION OF THE FIGURES

The invention will be better understood on reading the following description given solely by way of example and with reference to the appended figures, in which the same reference numbers designate elements having identical, analogous or similar functions, and in which.

DETAILED DESCRIPTION

The following embodiments are examples. Although the description refers to one or more embodiments, this does not necessarily mean that each reference is to the same embodiment, or that the features apply only to a single embodiment. Simple features of different embodiments may also be combined and/or interchanged to provide other embodiments.

In the present description, it is possible to index certain elements or parameters, for example a first element or second element as well as a first parameter and second parameter or a first criterion and second criterion, etc. In this case, it is a simple indexing process to differentiate and name similar but not identical elements or parameters or criteria. This indexing does not imply a priority of one element, parameter or criterion with respect to another and such denominations can easily be interchanged without departing from the scope of the present description. Nor does this indexing imply an order in time, for example to assess this or that criterion.

Figure 1:
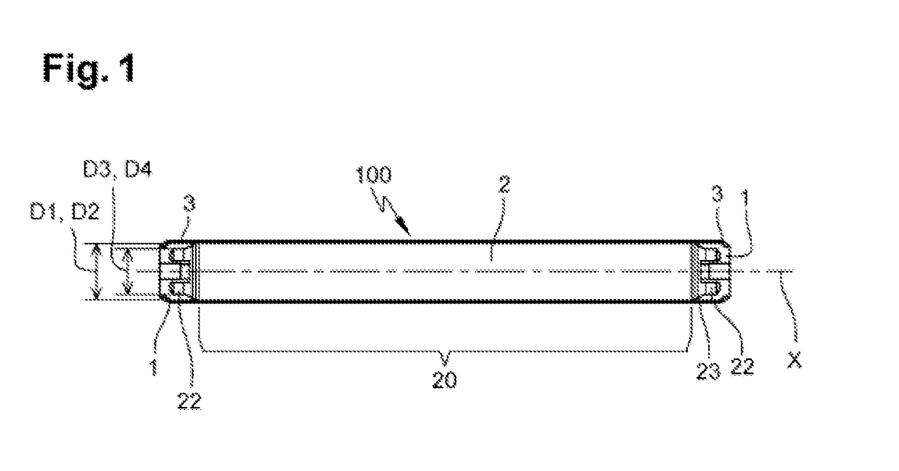
FIG. 1 is a cross-sectional view of a reservoir according to the invention.

FIG. 1 shows a pressurized fluid reservoir 100, in particular for storing and distributing pressurized gas—for example hydrogen at 700 bar—in a motor vehicle (not shown), according to one embodiment of the invention. The reservoir 100 is a cylindrical reservoir with a longitudinal axis X; it comprises a liner 2 comprising a tubular central portion 20 and two ends. The tubular central portion 20 is provided with a first cylindrical outer surface 21. First and second necks 22 are provided at the first and second ends of the liner 2. The first and a second necks 22 are connected to the tubular central portion 20 by first and second shoulders 23. The reservoir 100 comprises first and second end fittings 1 sealably assembled to the first and second necks 22. The reservoir 100 further comprises a reinforcing enclosure 3 of the liner 2. The first and second end fittings 1 each comprise an end portion 10 provided with a second cylindrical outer surface 11 positioned coaxially in the radially flush extension of the first cylindrical outer surface 21 (see also FIGS. 2 to 4).

As illustrated, the first cylindrical outer surface 21 of the tubular central portion 20 of the liner 2 has a first outer diameter D1 and the second cylindrical outer surface 11 of the end portion 10 of the first end fitting 1 has a second outer diameter D2 (see FIG. 2), such that the second outer diameter D2 is equal to the first outer diameter D1.

Figure 2:
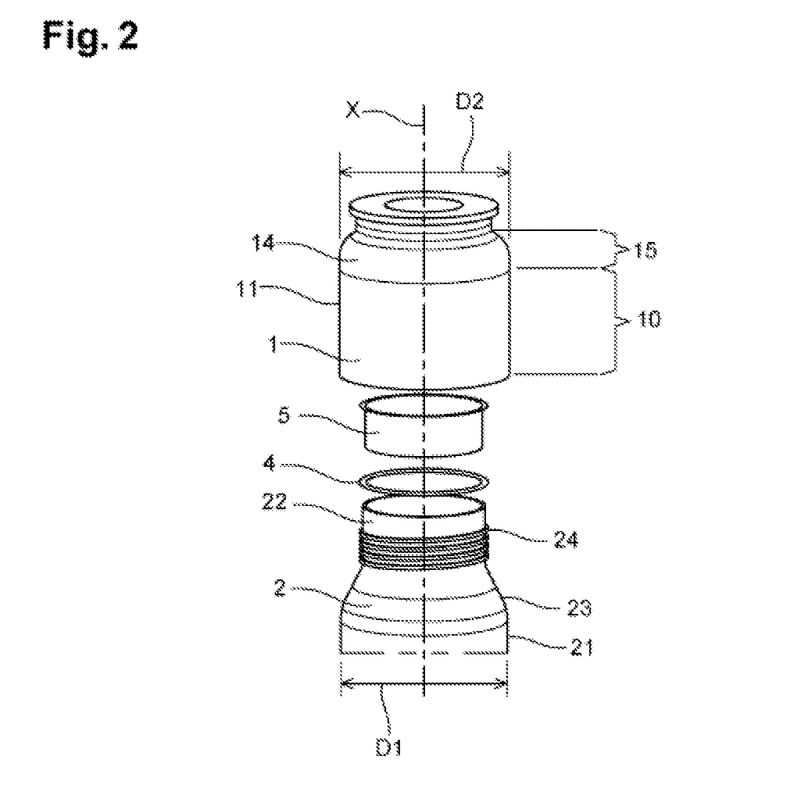
FIG. 2 is an exploded perspective view of a detail of the reservoir of FIG. 1, illustrating a first embodiment of the sealing of an end fitting according to the invention.

The neck 22 has a third outer diameter D3 and the first end fitting 1 comprises an inner recess 13 to accommodate the neck 22. The inner recess 13 has a first inner diameter D4 such that the third outer diameter D3 is equal to the first inner diameter D4. Moreover, the ratio of the first inner diameter D4 to the second outer diameter D2 is between 0.6 and 0.95, preferably between 0.8 and 0.95.

Advantageously, the end fitting is a piece of metal, for example aluminum.

Advantageously, the liner is manufactured by injection, rotational molding or extrusion-blow molding of a thermoplastic or thermoset polymer material, for example, polyamide, and the thickness of the liner is less than or equal to 5 mm.

Alternatively, the liner is manufactured by injection, rotational molding or extrusion-blow molding of a composite material.

Alternatively, the liner is made by filament winding.

Alternatively, the liner is made of metal, for example, 6061 aluminum.

Advantageously, the reservoir 100 comprises a fiberglass protective layer (not shown) surrounding the reinforcing enclosure 3 of the liner 2.

Advantageously, the reinforcing enclosure of the liner is coated with one or more layers of a fire-retardant material (not shown), preferably an intumescent fire-retardant material such as, for example, a coating based on silicate or phosphate, preferably ammonium polyphosphate dosed from 10% to 50%.

Still in the illustrated example, the reservoir 100 is a long and thin reservoir, that is to say, the ratio of its length to its diameter is greater than or equal to six (6). Indeed, the length of the reservoir 100 is between 1000 mm and 2000 mm and its diameter is between 100 mm and 150 mm.

Figure 3:
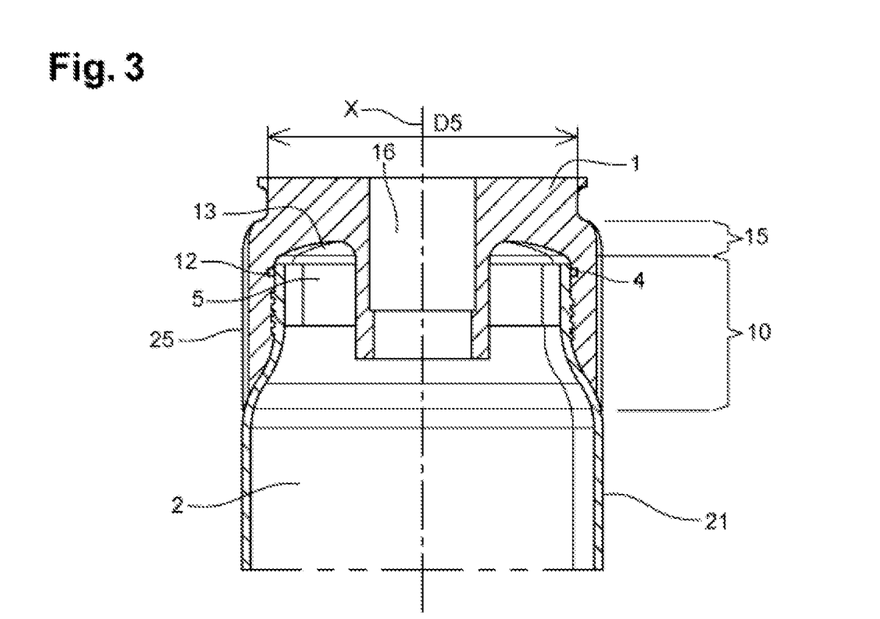
FIG. 3 is a sectional view of a detail of the reservoir of FIG. 1, illustrating the first embodiment of the sealing of an end fitting according to the invention.

FIGS. 2 and 3 illustrate a first embodiment of the sealing of the end fitting/neck assembly in which the first end fitting 1 is designed to adapt to a pressurized fluid reservoir 100, the reservoir comprising a liner 2 comprising a tubular central portion 20 provided with a first cylindrical outer surface 21, the first end fitting 1 comprising an end portion 10 provided with a second cylindrical outer surface 11 able to be positioned coaxially in the radially flush extension of the first cylindrical outer surface 21. In this first embodiment of sealing, the first end fitting 1 is sealably assembled on the outside of the first neck 22 by an annular sealing joint 4 arranged coaxially in an annular groove 12 formed in the inner recess 13 of the first end fitting 1. A shrink-fit ring 5 is arranged inside the first neck 22 to hold the first neck 22 radially tight against the annular sealing joint 4.

Advantageously, the first end fitting 1 is sealably assembled to the first neck 22 by an assembly of the screw-nut type. To this end, a thread 24 is provided on the outer periphery of the first neck 22.

Alternatively, the first end fitting 1 is sealably assembled to the first neck 22 by clipping, gluing or shrinking (not shown).

Advantageously, the annular sealing joint 4 is an elastomer seal.

Advantageously, the annular sealing joint 4 is an O-ring.

In addition to the elements already described above, FIG. 3 illustrates the presence of a tapped hole 16 in the longitudinal axis of the first end fitting 1 for mounting a solenoid valve (not shown) on the first end fitting 1.

Opposite the first cylindrical outer surface 21 of the tubular central portion 20 of the liner 2, the second cylindrical outer surface 11 of the end portion 10 of the first end fitting 1 is extended axially by a substantially hemispherical outer surface 14 of a middle portion 15 of the first end fitting 1, such that the substantially hemispherical outer surface 14 is surrounded by the reinforcing enclosure 3 (not shown) of the liner 2. The middle portion 15 of the first end fitting 1 comprises a fourth outer diameter D5, such that the ratio of the fourth outer diameter D5 to the second outer diameter D2 is between 0.5 and 0.95, preferably between 0.8 and 0.95.

Figure 4:
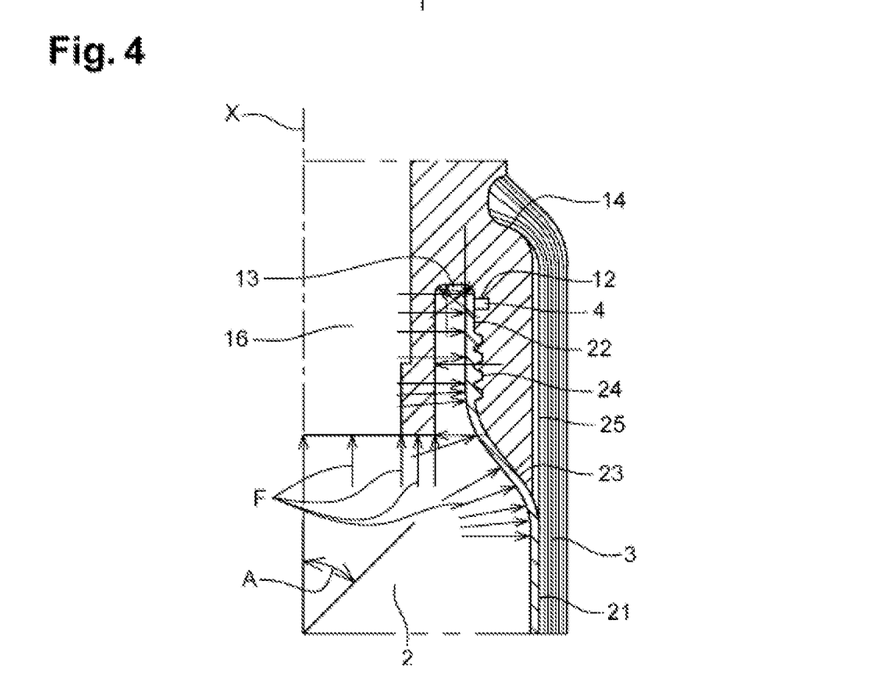
FIG. 4 is a sectional view of a detail of a reservoir according to the invention, illustrating a second embodiment of the sealing of an end fitting according to the invention.

FIG. 4 shows a second embodiment of the sealing of the end fitting/neck assembly. In this second embodiment of the sealing, the first end fitting 1 is sealably assembled on the outside of the first neck 22 by an annular sealing joint 4 arranged coaxially in an annular groove 12 formed in an inner recess 13 of the first end fitting 1, the internal pressure of the reservoir 100 having a tendency to push the first neck 22 radially outwards against the annular sealing joint 4. In the illustrated example, the inner recess 13 has the shape of an annular recess. A free, but reduced space is provided between the inner wall of the annular recess and the inner wall of the first neck 22. The purpose of this free space is to be occupied by the pressurized fluid in order to increase the radial forces exerted by the fluid on the inner wall of the first neck 22. The arrows F illustrate the directions of the pressure force exerted by the fluid on the inner wall of the liner 2.

As illustrated, the reinforcing enclosure 3 of the liner 2 consists of a composite winding comprising several layers of reinforcing filaments wound in a helix around the tubular central portion 20 of the liner 2 and around the middle portion 15 of the first end fitting 1, such that the helical winding angle A of at least one first layer of filaments is less than 54°, preferably less than 53°, and such that the helical winding angle of at least one second layer of filaments is between 53° and 56°, for example 54.7°.

It is expected that at least a first layer of filaments is an inner layer of the composite winding.

It is expected that at least a second layer of filaments is an outer layer of the composite winding.

Advantageously, the reinforcing filaments consist of glass fibers, aramid fibers and/or carbon fibers.

FIGS. 3 and 4 illustrate another embodiment of the invention where the second cylindrical outer surface 11 and the substantially hemispherical outer surface 14 of the end fitting 1 are covered, at least partially, with a composite structure 25, the composite structure 25 being sandwiched between the end fitting 1 and the reinforcing enclosure 3 of the liner 2.

A reservoir as mentioned above is for example placed on a vehicle, preferably a motor vehicle, which comprises:
  a reservoir according to the invention,
  an energy conversion means configured to supply energy to propulsion means of the vehicle, which is in fluidic communication with the reservoir via the first end fitting so that it can be supplied with fluid,
  a reservoir filling means, which is in fluidic communication with the reservoir via the first end fitting, and
  an actuator configured to selectively actuate either the energy conversion means or the reservoir filling means, in response to a control signal.

The invention is not limited to the embodiments presented; it is in particular possible to integrate at least one functional element into the first end fitting. This functional element is chosen from among a pressure relief valve, preferably with thermal triggering, a valve forming a flow limiter, a non-return valve, a manual shut-off valve, an injector, a filter, a temperature sensor and a pressure sensor. Likewise, the designs concerning the end fittings are intended for all pressurized reservoirs, regardless of the fluid carried or the very shape of the reservoir (cylindrical or ovoid).

The invention claimed is:

1. A pressurized fluid reservoir, comprising:
  a liner comprising:
  a tubular central portion provided with a first cylindrical outer surface having a first outer diameter D1, a first neck connected to the tubular central portion by a first shoulder,
a first end fitting sealably assembled to the first neck,
a reinforcing enclosure of the liner,
wherein the first end fitting comprises an end portion provided with a second cylindrical outer surface positioned coaxially with the tubular central portion in a radially flush extension of the first cylindrical outer surface, and wherein the first end fitting is sealably assembled on an outside of the first neck of the liner by means of an annular sealing joint arranged coaxially with the end portion in an annular groove formed in an inner recess of the first end fitting so that an internal pressure of the reservoir has a tendency to push the neck radially outwards against the annular sealing joint.

2. The pressurized fluid reservoir according to claim 1, wherein the second cylindrical outer surface of the end portion of the first end fitting has a second outer diameter D2, such that D2 is equal to D1.

3. The pressurized fluid reservoir according to claim 1, wherein the first end fitting is sealably assembled to the first neck by a screw-nut assembly.

4. The pressurized fluid reservoir according to claim 1, wherein opposite the first cylindrical outer surface of the tubular central portion of the liner, the second cylindrical outer surface of the end portion of the first end fitting is extended axially by a substantially hemispherical outer surface of a middle portion of the first end fitting, such that the substantially hemispherical outer surface is surrounded by the reinforcing enclosure of the liner.

5. The pressurized fluid reservoir according to claim 4, wherein the middle portion of the first end fitting comprises a fourth outer diameter D5, such that the ratio D5/D2 is between 0.5 and 0.95.

6. The pressurized fluid reservoir according to claim 4, wherein the reinforcing enclosure of the liner consists of a composite winding comprising several layers of reinforcing filaments wound in a helix around the tubular central portion of the liner and around the middle portion of the first end fitting, such that the helical winding angle (A) of at least one first layer is less than 54°, and such that the helical winding angle of at least one second layer is between 53° and 56°.

7. The pressurized fluid reservoir according to claim 1, wherein the first end fitting further comprises at least one functional element selected from the group consisting of a pressure relief valve, a valve forming a flow limiter, a non-return valve, a manual shut-off valve, an injector, a filter, a temperature sensor and a pressure sensor.

8. The pressurized fluid reservoir according to claim 1, wherein the liner is manufactured by injection, rotational molding or extrusion-blow molding of a thermoplastic or thermosetting polymer material.

9. The pressurized fluid reservoir according to claim 1, wherein the liner is manufactured by filament winding.

10. The pressurized fluid reservoir according to claim 1, wherein the reinforcing enclosure of the liner is coated with one or more layers of a fire-retardant material.

11. The pressurized fluid reservoir according to claim 1, wherein the end fitting is a piece of metal.

12. The pressurized fluid reservoir according to claim 4, wherein the second cylindrical outer surface and the substantially hemispherical outer surface of the end fitting are covered, at least partially, with a composite structure, the composite structure being sandwiched between the end fitting and the reinforcing enclosure of the liner.

13. The pressurized fluid reservoir according to claim 5, wherein the ratio D5/D2 is between 0.8 and 0.95.

14. The pressurized fluid reservoir according to claim 6, wherein the helical winding angle (A) of at least one first layer is less than 53°.

15. The pressurized fluid reservoir according to claim 6, wherein the helical winding angle of at least one second layer is 54.7°.

16. The pressurized fluid reservoir according to claim 8, wherein the liner is manufactured by injection, rotational molding or extrusion-blow molding of a thermoplastic polymer material filled with reinforcing fibers.

17. The pressurized fluid reservoir according to claim 10, wherein the fire-retardant material is an intumescent fire-retardant material.

18. The pressurized fluid reservoir according to claim 17, wherein the intumescent fire-retardant material is a coating based on silicate or phosphate.

19. The pressurized fluid reservoir according to claim 18, wherein the coating based on silicate or phosphate comprises ammonium polyphosphate dosed from 10% to 50%.

* * * * *